US009092889B2

(12) United States Patent
Sakamaki

(10) Patent No.: US 9,092,889 B2
(45) Date of Patent: Jul. 28, 2015

(54) IMAGE PROCESSING APPARATUS, IMAGE PROCESSING METHOD, AND PROGRAM STORAGE MEDIUM

(71) Applicant: CASIO COMPUTER CO., LTD., Tokyo (JP)

(72) Inventor: Katsuya Sakamaki, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 358 days.

(21) Appl. No.: 13/661,397

(22) Filed: Oct. 26, 2012

(65) Prior Publication Data

US 2013/0108156 A1     May 2, 2013

(30) Foreign Application Priority Data

Oct. 31, 2011   (JP) ................................. 2011-238386

(51) Int. Cl.
     *G06K 9/00*        (2006.01)
     *G06T 11/00*      (2006.01)

(52) U.S. Cl.
     CPC ....... *G06T 11/00* (2013.01); *G06T 2207/30201* (2013.01)

(58) Field of Classification Search
     CPC ............................................. G06T 2207/30201
     See application file for complete search history.

(56) References Cited

U.S. PATENT DOCUMENTS

| 8,184,925 | B1* | 5/2012 | Berridge | 382/274 |
|---|---|---|---|---|
| 2004/0170337 | A1* | 9/2004 | Simon et al. | 382/254 |
| 2006/0082579 | A1* | 4/2006 | Yao | 345/473 |
| 2009/0087035 | A1* | 4/2009 | Wen et al. | 382/118 |
| 2009/0154762 | A1* | 6/2009 | Choi et al. | 382/100 |
| 2009/0252435 | A1* | 10/2009 | Wen et al. | 382/284 |
| 2011/0235905 | A1* | 9/2011 | Yokokawa | 382/165 |

FOREIGN PATENT DOCUMENTS

| JP | 02-197968 A | | 8/1990 |
|---|---|---|---|
| JP | 2003-150955 A | | 5/2003 |
| JP | 2003150955 A | * | 5/2003 |
| JP | 2007-066199 A | | 3/2007 |
| JP | 2011-53737 A | | 3/2011 |
| JP | 2011-139329 A | | 7/2011 |
| JP | 2011-151454 A | | 8/2011 |

OTHER PUBLICATIONS

Japanese Office Action dated Oct. 1, 2013 (and English translation thereof) in counterpart Japanese Application No. 2011-238386.
Japanese Office Action dated Mar. 25, 2014 (and English translation thereof) in counterpart Japanese Application No. 2011-238386.

* cited by examiner

*Primary Examiner* — Stephen R Koziol
*Assistant Examiner* — Jonathan S Lee
(74) *Attorney, Agent, or Firm* — Holtz, Holtz, Goodman & Chick PC

(57) ABSTRACT

An image processing apparatus includes a convertor configured to convert a photographic image into a first image with a specific tone, and a synthesizer configured to synthesize the photographic image on the first image converted by the convertor, at a predetermined transmittance to generate a second image.

11 Claims, 7 Drawing Sheets

| PAINTING STYLE | BACKGROUND | FACE |
|---|---|---|
| OIL PAINTING | na1 % | na2 % |
| WATER COLOR PAINTING | nb1 % | nb2 % |
| PASTEL PAINTING | nc1 % | nc2 % |
| COLOR PENCIL SKETCH | nd1 % | nd2 % |
| ⋮ | ⋮ | ⋮ |

IMAGE PROCESSING APPARATUS, IMAGE PROCESSING METHOD, AND PROGRAM STORAGE MEDIUM

CROSS-REFERENCE TO RELATED APPLICATIONS

This application is based upon and claims the benefit of priority from prior Japanese Patent Application No. 2011-238386, filed Oct. 31, 2011, the entire contents of which are incorporated herein by reference.

BACKGROUND OF THE INVENTION

1. Field of the Invention

The present invention relates to an image processing technique for converting, for example, a photographic image obtained by photograph taking, into a painting image with an artistic feature such as a water color painting style (snapshot-to-painting conversion).

2. Description of the Related Art

For example, Jpn. Pat. Appln. KOKAI Publication No. 2011-139329 has disclosed an image processing technique for use in converting a photographic image obtained by photograph taking into a painting image (an image that looks like oil painting, water color painting, or the like); the technique uses a facial recognition technique to determine the types (age, gender, race, and the like) of a person present in a photographic image and converts the photographic image into an image of a painting style associated with the determined types of person (subjects the photographic image to a snapshot-to-painting conversion).

However, even with a change of the tone of the image according to the types of the person, this image processing technique relatively beautifully converts scenery, buildings, and the like but fails to naturally convert the details in the image, particularly the portion of the image showing the person. That is, snapshot-to-painting conversion may blur the person's face portion or produce useless brush lines or color tones in the face portion, making the face portion look unnatural. In other words, disadvantageously, the image may be excessively deformed in a painting manner.

BRIEF SUMMARY OF THE INVENTION

An object of the present invention is to enable an image with both the appropriate realism of a photographic image and a flavor of painting to be generated if the photographic image is converted into a painting image.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

FIG. 3 is a conceptual drawing showing a transmittance table.

DETAILED DESCRIPTION OF THE INVENTION

An embodiment of an image processing apparatus according to the present invention will now be described with reference to the accompanying drawings.

Figure 1:
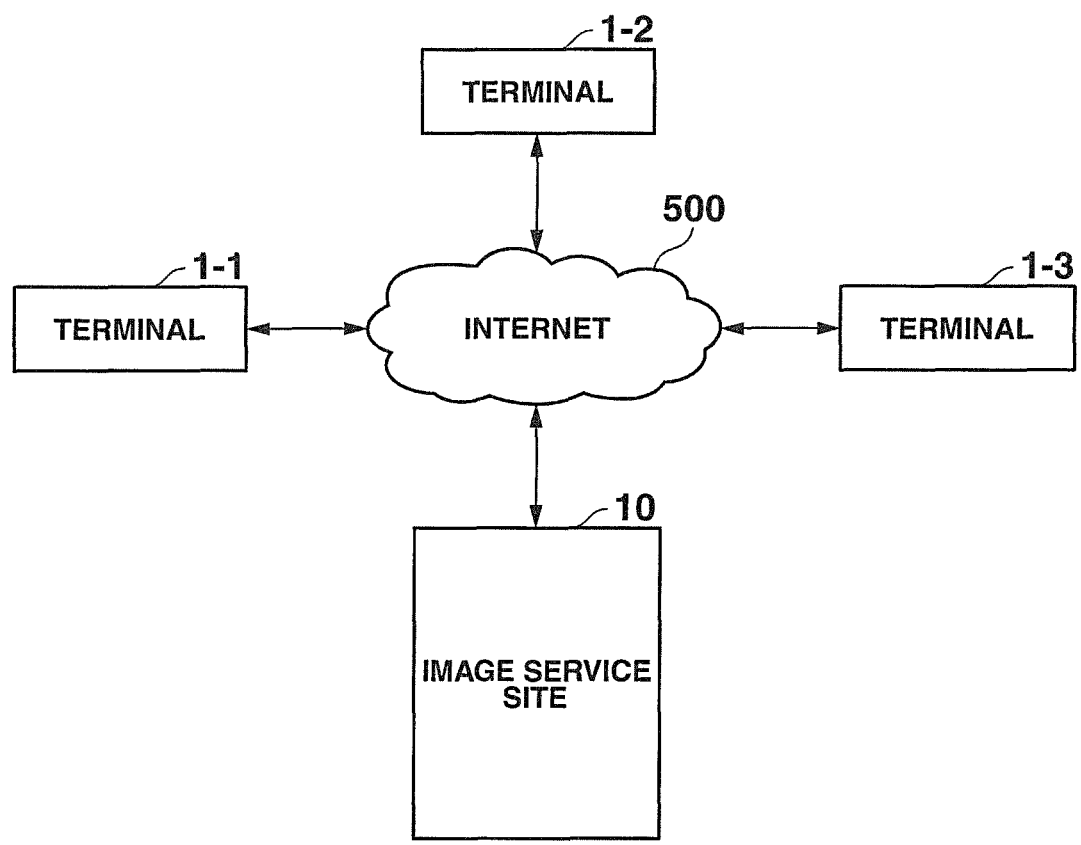
FIG. 1 is a block diagram showing a network including an image service site.

The embodiment of the present invention will be described below. FIG. 1 is a block diagram showing a network including an image service site 10 with an SNS (social networking service) function. The image service site 10 provides services such as saving of image data uploaded by users (mostly image data on photographs taken with digital cameras), conversion of the uploaded image data into painting images, and browsing and downloading of the uploaded images and painting images resulting from the conversion.

A plurality of terminals 1-1, 1-2, 1-3, . . . used by any users are connected to the image service site 10 via the Internet 500. The terminals 1-1, 1-2, 1-3, . . . are any apparatuses with a communication function and a function to display images expressed by image data, for example, normal personal computers or cellular phone terminals.

Figure 2:
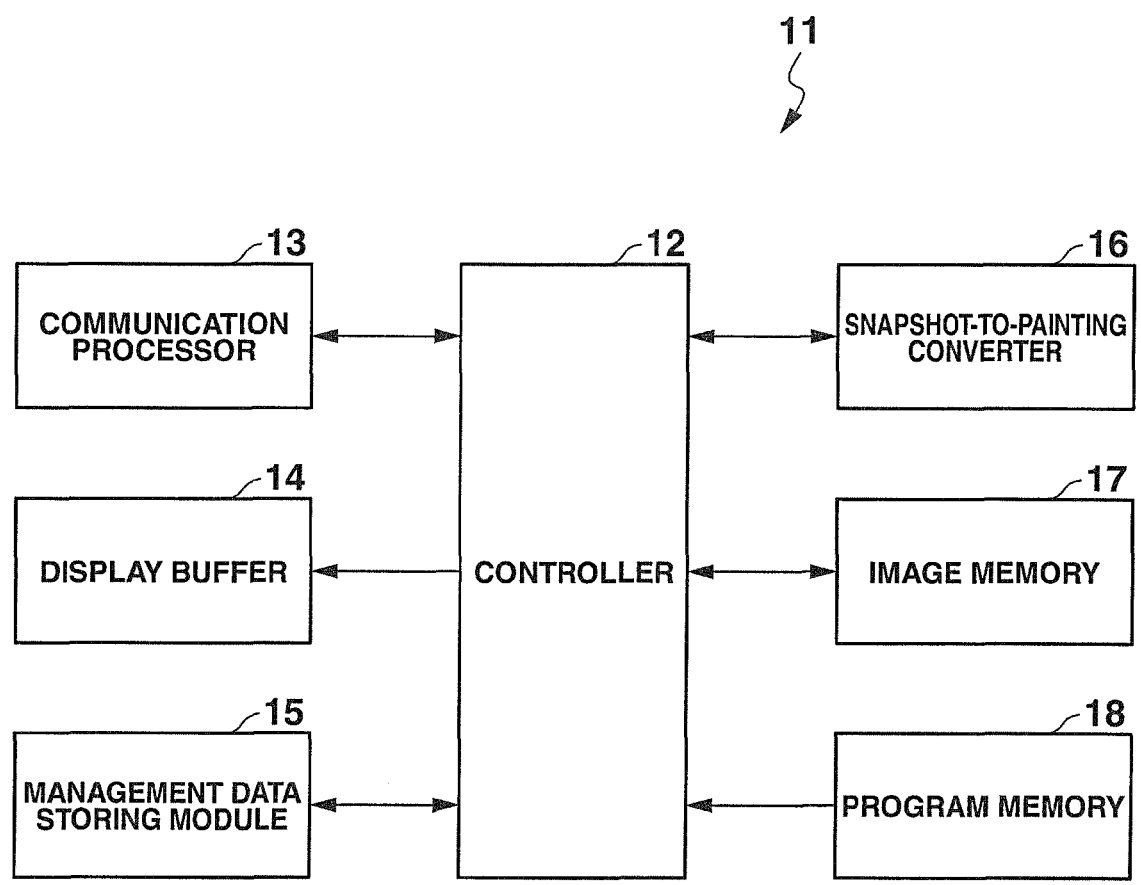
FIG. 2 is a block diagram showing a general configuration of a server that implements the image service site.

FIG. 2 is a block diagram showing a general configuration of a server 11 which implements the image service site 10 and to which the present embodiment is applied. The server 11 mainly comprises a controller 12, a communication processor 13, a display buffer 14, a management data storing module 15, a snapshot-to-painting converter 16, an image memory 17, and a program memory 18.

The communication processor 13 controls transmission and reception of various data including image data between the server 11 and each of the terminals 1-1, 1-2, 1-3, . . . based on TCP/IP (Transmission. Control Protocol/Internet Protocol).

The management data storing module 15 stores various types of information on users who utilize the image service site 10 (hereinafter simply referred to as users) and various types of management data comprising image data uploaded by the users. The management data storing module 15 comprises, for example, a hard disk apparatus.

The snapshot-to-painting converter 16 comprises an image processing circuit configured to carry out a snapshot-to-painting conversion to convert image data stored in the image memory 17 into image data on a painting image (hereinafter painting image data), and a memory.

Here, the snapshot-to-painting conversion is image processing in which pixels forming an image such as a photograph are converted into what is called a painting image that looks like (a) an oil painting, (b) heavy oil painting, (c) gothic oil painting, (d) fauvist painting, (e) water color painting, (f) gouache painting, (g) pastel painting, (h) drawing, (i) air brush, or (j) HDR (High Dynamic Range) processed image, according to predetermined parameters (snapshot-to-painting conversion parameters).

The snapshot-to-painting conversion is in principle a type of effect processing and is based on a program designed to make an image lock a painting by adjusting and combining parameters for various types of effect processing known from photo retouch software.

Examples of the effect processing include the following types of processing.

(a) Resolution processing: texturing processing that maps texture and provides a special texture to an image. The resolution processing classifies the image into a contour portion, a texture portion such as a fine pattern, and a flat portion, and appropriately processes each of these portions to improve the texture and resolution.

(b) HSV processing: classifies each color into three elements: hue, saturation, and a value and adjusts these elements.

(c) RGB processing: adjusts the degrees of R (red), G (green), and B (blue) of an image.

(d) RGB change: changes the values of R (red), G (green), and B (blue) of an image to G (green), B (blue), and R (red).

(e) Edge extraction: applies a filter called a Laplasian filter to extract edges.

(f) Median density extraction: applies a filer called a median filter to extract a median density.

(g) Density extraction: extracts histograms of P. G, and B of adjacent pixels and carries out processing corresponding to each case where the minimum density, the median density, or the maximum density is extracted.

(h) Equalization: defines the darkest and brightest portions of an image to be black and white, respectively, creates a histogram appropriately distributed between the black and the white, and modifies the contrast or extends the histogram of the image.

(i) Gamma correction: maintains the bright portion aria the dark portion and adjusts an intermediate brightness.

(j) Shadowing: brightens the dark areas of an image or darkens the bright areas of an image.

(k) Solarization: inverts the RGB value of a pixel when the RGB value is indicative of a brightness equal to or higher than a threshold.

(l) Noise addition: randomly draws dots, generates noise, and adjusts the amount and color of the noise.

(m) HDR (High Dynamic Range) processing: uses tone mapping to incorporate a wide dynamic range photographic image that cannot be expressed by normal photography into a narrow dynamic range image to correct overexposure and underexposure, thus enhancing the power of expression. The HDR processing makes a photograph more similar to the corresponding memory or impression in the person's brain to realize a new photograph expression combined with an artistic expression.

The image memory 17 stores image data uploaded by users and painting image data described above. The image memory 17 is, for example, an image database comprising, for example, a high-capacity hard disk apparatus.

The display buffer 14 is a memory that stores display data comprising one or many items of image data for browsing when the server 11 allows a user to browse image data or the like stored in the image memory 17.

The controller 12 controls the general operation of the server 11, that is, various operations required to operate the image service site 10. Furthermore, the controller 12 cooperates with the snapshot-to-painting converter 16 in carrying out a snapshot-to-painting conversion process described below. The controller 12 comprises a CPU and peripheral circuits, an external working memory, and a sophisticated graphic accelerator.

The program memory 18 is a storage device such as a hard disk device which stores, in an updatable manner, programs for allowing the controller 12 to carry out the above-described various types of processing, and various data. The various data stored in the program memory 18 include data indicative of a transmittance table 100 shown in FIG. 3.

The transmittance table 100 is data used for an image conversion process carried out by the controller 12 as described below. As shown in FIG. 3, the transmission table 100 shows transmittances corresponding to the respective types of painting (oil painting style, water color painting style, pastel painting style, and the like) into which the painting converter 16 can convert a photographic image. Furthermore, each painting style involves two types of transmittance, that is, a second transmittance applied to a face area, na2%, nb2%, nc2%, nd2%, . . . and a first transmittance applied to a background area, the entire area except for the face area, na1%, nb1%, nc1%, nd1%, . . . .

Here, the transmittance for each painting style shown in the transmittance table 100 is the transparency of the original image measured when the original image is superimposed and synthesized on a painting image resulting from a conversion into any painting style, in other words, the degree to which the painting image is conspicuous in the synthesized image. The transparency of the original image is controlled before it is synthesized on the painting image. For example, no original image is synthesized on a painting image if the transmittance is 100%. If the transmittance is 0%, the synthesized image is the same as the original image.

Furthermore, the specific transmittance is predetermined based on a rule of thumb. Basically, a painting style involving a more significant change in the details of the original image when the original image is converted into a painting image has relatively lower transmittances than a painting style involving a less significant change in the details of the original image. For example, a comparison of the oil painting style and the water color painting style indicates that the oil painting style has transmittances adjusted to relatively smaller values, while the water color painting style has transmittances adjusted to relatively greater values. Moreover, for each painting style, the first transmittance for the background and the second transmittance for the face are adjusted such that the second transmittance is relatively lower than the first transmittance.

Operation of the controller 12 will be described which is performed when the server 11 converts, for example, an image uploaded by the user or stored in the image memory 17 into a painting image in accordance with the user's instruction.

Figure 4:
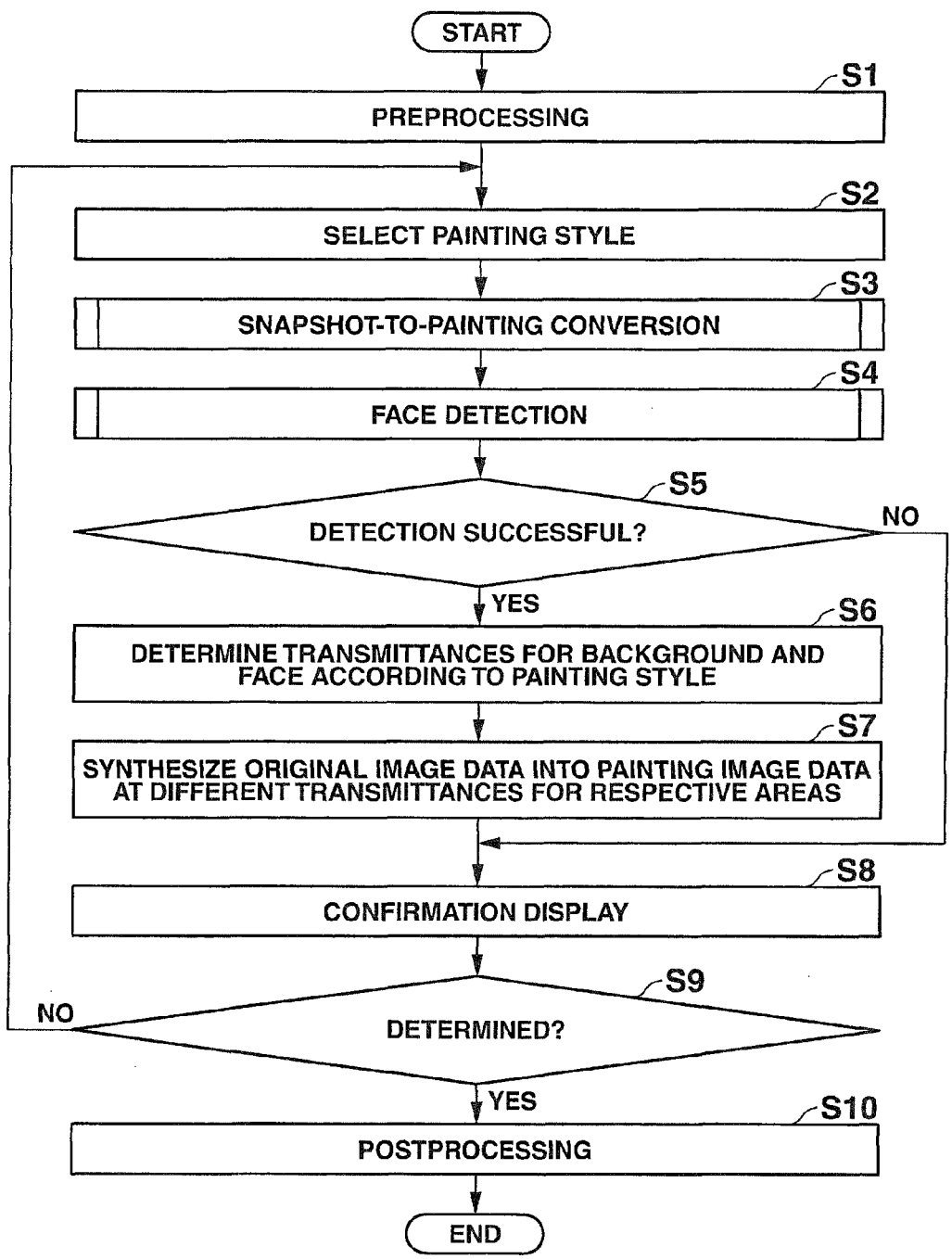
FIG. 4 is a flowchart showing an image conversion process carried out by a controller of the server.
Figure 5:
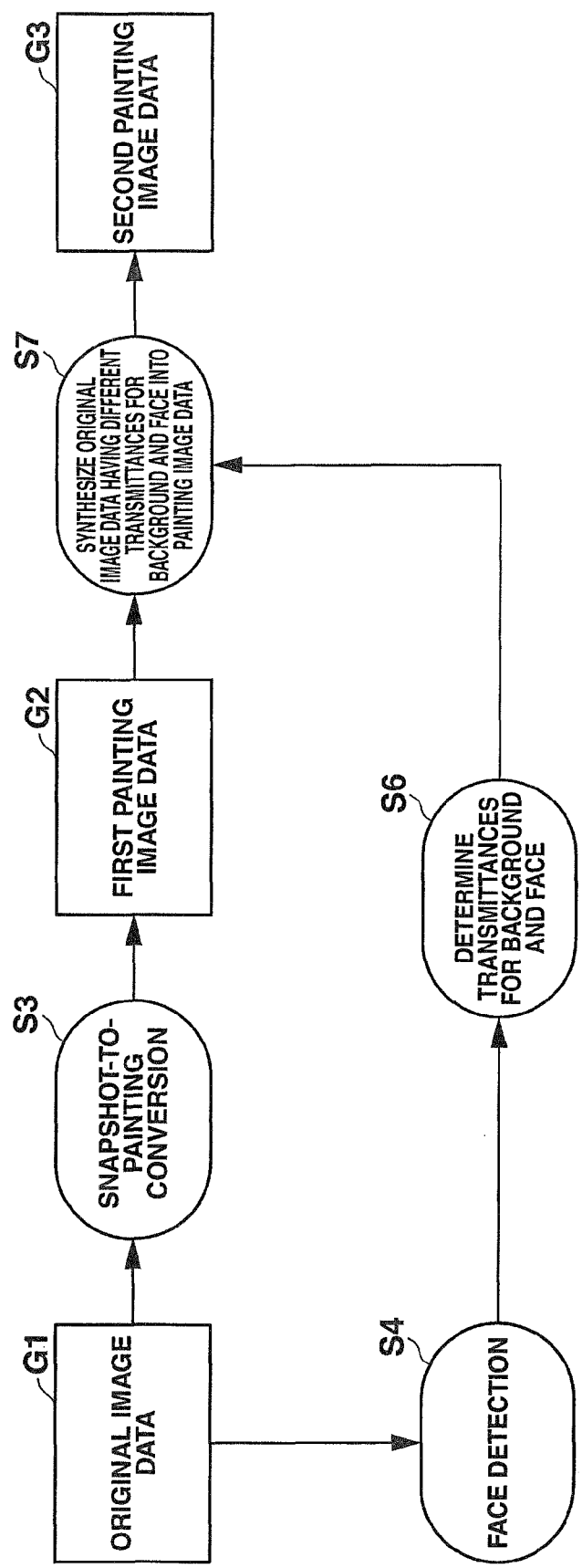
FIG. 5 is a diagram illustrating an essential part of the image conversion process.

When the user specifies a target image to be converted into a painting image (hereinafter referred to as an original image), the controller 12 of the server 11 carries out an image conversion process shown in a flowchart in FIG. 4. FIG. 5 is a diagram illustrating an essential part of the image conversion process. FIG. 5 shows how image data is converted by steps of FIG. 6.

The controller 12 starts processing when the user specifies the original image, and immediately carries out preprocessing (step S1). The preprocessing converts image data from a JPEG format into a bit map format in order to enable the original image to be subjected to image processing in units of pixels.

Then, the controller 12 prompts the user to select a painting style into which the image is to be converted (step S2). Examples of the painting style that the user is prompted to select include the above-described oil painting, water color painting, pastel painting, color pencil sketch, and HDR processing.

Then, the controller 12 transmits the image data on the original image (hereinafter referred to as original image data) resulting from the conversion in the preprocessing in step S1, to the snapshot-to-painting converter 16. The controller 12 then allows the snapshot-to-painting converter 16 to carry out a snapshot-to-painting conversion process to the painting style selected by the user (step S3).

That is, the controller 12 allows the snapshot-to-painting converter 16 to carry out a snapshot-to-painting conversion in accordance with a image tone conversion algorithm for the selected painting style, thus converting original image data G1 into first painting image data G2 (step S1). Furthermore, the controller 12 saves the painting image data G2 resulting from the conversion by the snapshot-to-painting converter 16, to a work area secured in the display buffer 14. The painting image G2 resulting from the conversion in the processing in step S3 is hereinafter referred to as a first painting image.

Subsequently, the controller 12 carries out, besides the snapshot-to-painting conversion process by the snapshot-to-painting converter 16, a face detection process of detecting any person' face present in the original image as shown in FIG. 5 (step S4). The face detection process is based on application of a well-known technique of using image recognition techniques, for example, binarization, contour extraction, and pattern matching to detect a specific area (hereinafter referred to as a face area) corresponding to a person's face and containing the eyes, nose, and mouth arranged in a positional relationship within a given range.

Furthermore, the face area detected in the face detection process in step 4 is enclosed by the contour of the face except for a head hair portion. Various data such as pattern data which are required for the face detection process are stored in the program memory 18.

Figure 6A:
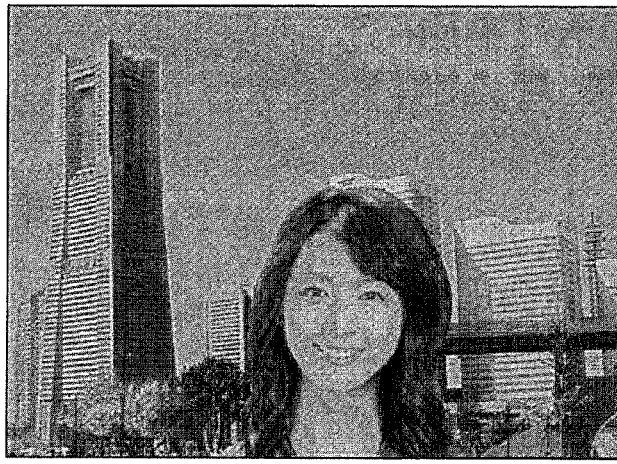
FIG. 6A is a view showing an example of an original image with a person's face present therein.
Figure 6B:
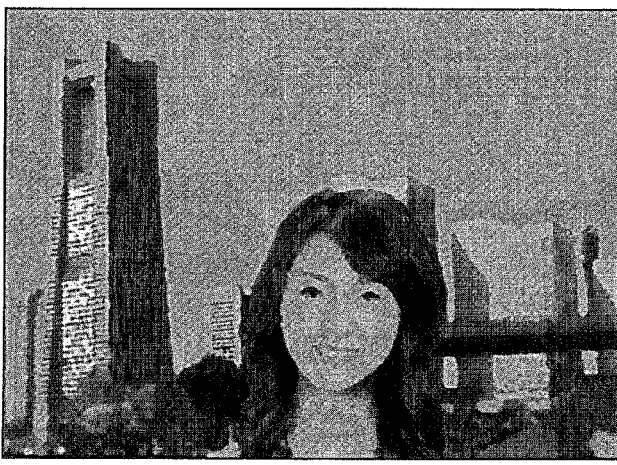
FIG. 6B is a view showing an example of a first painting image.
Figure 7A:
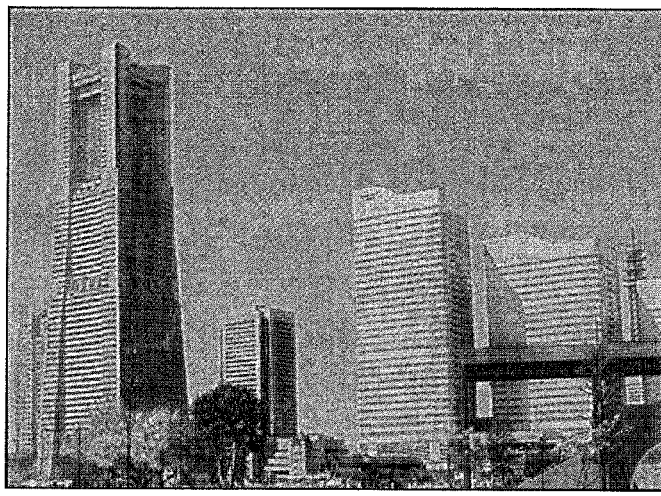
FIG. 7A is a view showing an example of an original image with no person's face present therein.
Figure 7B:
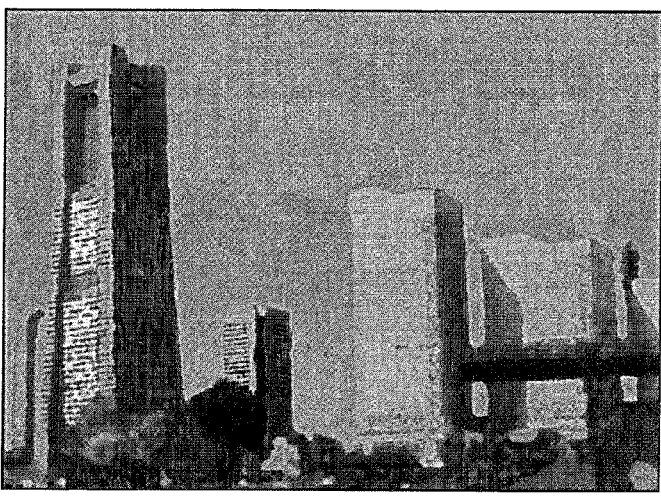
FIG. 7B is a view showing an example of a first painting image.

Then, the controller 12 carries out the following process according to the result of the face detection process. First, a process carried out if any person's face fails to be detected in the original image (step S5: NO) will be described. FIG. 7A is a view showing an example of an original image G1A where the person's face fails to be detected in the face detection process. FIG. 7B is a view showing an example of a first painting image G2A resulting from the snapshot-to-painting conversion process in step 3. Images in FIG. 6A and FIG. 6B are affixed with reference numerals similar to those for the corresponding image data shown in FIG. 5 (original image data and first, painting image data).

If the person's face fails to be detected, the controller 12 immediately provides confirmation display (step S8). In the processing in step S8, the image data into which the original image data G1 has been converted and which is stored in the work area of the display buffer 14 is resized into a number of pixels for confirmation, for example, 800×600 pixels. The resized image data is then transmitted to the user's terminal 1, with the converted image displayed on a screen of the terminal 1. That is, the processing in step S8 carried out when the person's face fails to be detected is a process of displaying such first painting image G2A as shown in FIG. 7B on the screen of the user's terminal 1.

Figure 6C:
FIG. 6C is a view showing an example of a second painting image.

Now, processing carried out if any person's face can be detected in the original image during the face detection process in step S4 (step S5: YES) will be described. FIG. 6A shows an example of the original image G1 where the person's face can be detected. FIG. 6B shows an example of the first painting image G2 resulting from the snapshot-to-painting conversion corresponding to FIG. 6A. The images in FIG. 6A to FIG. 6C are affixed with reference numerals similar to those for the corresponding image data shown in FIG. 5 (original image data, first painting image data, and second painting image).

If the person's face can be detected, the controller 12 first references the transmittance table 100 shown in FIG. 3 to determine the transmittance individually for the background area in the image and for the face area in the image according to the painting style selected by the user and expressed in the first painting image G2 (step S6); the transmittance is used in synthesizing the original image G1 on the first painting image G2 in processing described below the face area in the image is enclosed by the contour of the person's face except for the head hair portion as described above.

The transmittance for the background area determined by the controller 12 during the processing in step S6 is one of the above-described first transmittances for the background na1%, nb1%, nc1%, nd1%, . . . which corresponds to the painting style selected by the user. Furthermore, the transmittance for the face area is one of the above-described second transmittances for the face area na2%, nb2%, nc2%, nd2%, . . . which corresponds to the painting style selected by the user.

That is, in the processing in step S6, the controller 12 determines the transmittances for the face area and the background area as follows. For example, when the user selects the oil painting style, the controller 12 determines a transmittance lower than the transmittance determined in the case where the user selects the water color painting style. At the same time, in the processing in step S6, the controller 12 determines, for the face area, a transmittance adjusted to a relatively smaller value than the transmittance for the background area.

Thereafter, the controller 12 synthesizes the background area and face area in the original image data on the first painting image data at the different transmittances to generate second painting image data 53 as shown in FIG. 5. The controller 12 stores the generated second painting image data 53 in a work area of the display buffer 14 (step S7).

More specifically, the synthesizing process in step S7 is a conversion process of setting a pixel value for the color component of each pixel in the newly generated second painting image data G3 such that in this pixel value, the corresponding pixel value in the original data image S1 and the corresponding pixel value in the first painting image data G2 are reflected in a predetermined ratio. That is, this process synthesizes the original image on the first painting image in a transmissive manner by α blending (a process of synthesizing two images by a coefficient α).

FIG. 6C shows an example of the second painting image G3 generated by the processing in step S7. The second painting image G3 is obtained by synthesizing the original image G1 on the first painting image G2 in a transmissive manner. Thus, even if details in the first painting image G2 are blurred or useless brush lines or color tones appear in the first painting image, the blurs are unnoticeable and the frequency at which useless brush lines or color tones appear decreases.

Moreover, during the transmissive synthesis, the transmittance for the original image G1 is relatively lower in the face area than in the background area. Thus, in the second painting image G3, blurs in the details in the face area such as the eyes, the nose, the mouth, the cheeks, and the forehead are much more unnoticeable than blurs in the details in the background area, and the frequency at which useless brush lines or color tones appear sharply decreases.

Then, the controller 12 carries out the above-described confirmation display process (step S8). That is, the controller 12 allows such second painting image G3 as shown in FIG. 6C to be displayed on the screen of the user's terminal 1.

Thereafter, the controller 12 prompts the user to determine that the conversion is to be carried out in accordance with the contents displayed for confirmation in step S8 or to change the painting style (step S9). If the determination is not, selected (step S9: NO), the controller 12 returns to the processing in step prompt the user to reselect a new painting style.

Then, the controller 12 carries out post-processing (step S10) if the user indicates the determination (step S9: YES). The post-processing in step S10 is mostly a process of converting the first painting image or second painting image stored in the display buffer 14 into image data in the JPEG format, in which the original image is set. Thus, the controller 12 ends the image conversion process. After the post-processing in step S10, the image data is finally transmitted to the user's terminal 1 or stored in the image memory 17.

As described above, when the original image is converted into a painting image, if the original image is a photographic image such as a portrait with any person's face present therein as shown in FIG. 6A, the present embodiment operates as follows the original image G1 is synthesized on the first painting image G2 generated from the original image G1 in a transmissive manner to generate, as a final painting image, the second painting image G3 in which blurs in the details are more unnoticeable than in the first painting image G2 and in which useless brush lines or color tones appear less frequently than in the first painting image G2 (see FIG. 5).

Thus, if the original image is a portrait or the like, then even after a conversion into a painting image, in particular, the details of the person's face such as the eyes, the nose, the cheeks, and the forehead can be kept natural. Consequently, an image with both the appropriate realism of a photograph and a flavor of a painting can be generated. As a result, unlike a simple painting image, an interesting image can be obtained by converting a photographic image into a painting image.

Moreover, in synthesising the original image G1 on the first painting image G1 in a transmissive mariner, the present embodiment individually sets the transmittance for the face area and the transmittance for the other, background area to reduce the transmittance for the face area below the transmittance for the background area. This makes blurs in the details such as the eyes, the nose, the mouth, the cheeks, and the forehead much more unnoticeable and sharply reduces the frequency at which useless brush lines or color tones appear. Therefore, the person can be more realistically portrayed, with a flavor of painting maintained in the painting imago.

Figure 7C:
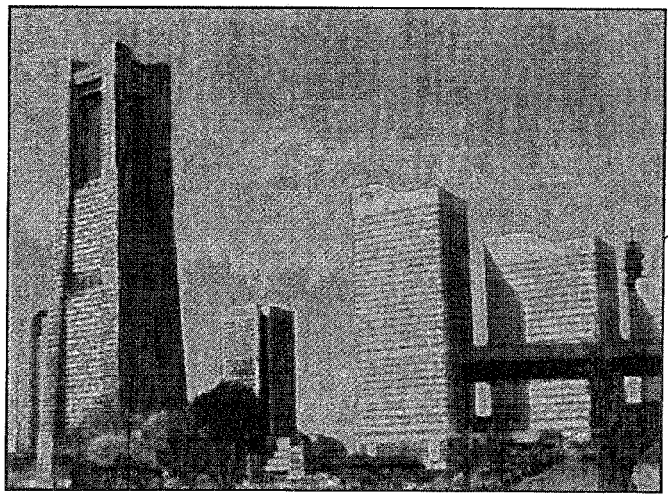
FIG. 7C is a view showing another example of a second painting image.

The present embodiment synthesizes the original image on the first painting image resulting from a snapshot-to-painting conversion process, in a transmissive manner under the condition that the original image is a photograph such as a portrait and that any person's face can be detected in the original image. However, when the present invention is implemented, the original image may be synthesized on the first painting image in a transmissive manner regardless of whether or not any person's face can be detected in the original image. FIG. 7C is a view showing an example of a second painting image G3A generated by synthesizing the original image G1A, in a transmissive manner, on the first painting image G2A shown in FIG. 7B and resulting from a snapshot-to-painting conversion.

Furthermore, the present embodiment describes the case where the face area in the original image which is synthesized on the second painting image transmittance different from the transmittance for the background area is enclosed by the contour of the face except for the head hair portion. However, the face area may include the head hair portion or a specific area which encloses the face area including the head hair portion and which is, for example, rectangular, circular, or elliptical.

Moreover, one or more (for example, single or dual) ring areas that enclose, the face area may be set in the original image, and a transmittance different from those for the face area and the background area may be set for the ring areas. In this case, the ring areas may be set to have an intermediate transmittance between the transmittances for the face area and the background area so as to obtain a more natural painting image without making any clear difference in realism between the face area and the background area. This effect is significant particularly if a specific area including the face portion is defined to be the face area. If a plurality of ring areas are provided, the transmittance may be varied step by step for the respective ring areas.

Furthermore, according to the present embodiment, if the original image is a photograph such as a portrait and is synthesized on the first painting image in a transmissive manner, the transmittance for the face area is different from the transmittance for the background area. However, when the present invention is implemented, even if the original image is a photograph such as a portrait, the original image may be synthesized on the first painting image at a constant transmittance without the need to divide the image into areas.

Even in this case, a second painting image can be generated in which blurs in the details are more unnoticeable than in the first painting image and in which useless brush lines or color tones appear less frequently than in the first painting image. The final painting image can realistically portray the person while providing a flavor of a painting.

Furthermore, the present embodiment describes the case where any person's face is detected in the original image. The original image is synthesized on the first painting image in transmissive manner typically under the condition that the face can be detected in the original image. However, according to the present invention, the detection target in the original image is not necessarily the person's face but may be a flower or an animal (a dog, a cat, or the like) as long as the specific subject enables the corresponding area to be detected.

Additionally, the area in the finally generated painting image which is to be kept real and similar to the corresponding area in the original image is not necessarily the face area that can be detected by the image recognition process but may manually specified by the user. In this case, the controller 12 may be allowed to carry out such processing as described below. That is, after the original image is converted into the first painting image, the user is prompted to specify any area, that is, an area to be kept real and similar to the corresponding area in the original image, in the first painting image by operating a touch panel, a mouse, or the like. Then, after determining the area specified by the user to be the specific area, the controller 12 may allow execution of a process of synthesizing the original image on the first painting image so that the specific area has a lower transmittance than the other portions of the background area.

When the area to be kept real and similar to the corresponding area in the original image is manually specified by the user, the portion of the finally generated painting image which suits the user's preference can be kept real and similar to the corresponding portion of the original image as necessary.

In addition, according to the present embodiment, when the original image is synthesized on the first painting image in a transmissive manner, the transmittances (first transmittance and second transmittance) are determined for the type of painting style selected by the user. However, the following method may be used. For example, if the apparatus configured to allow the user to select not, only the painting style but also the intensity of conversion into a painting image, that is, the intensity of painterly features in the painting image resulting from the conversion, then even with the same painting style, the transmittance may be varied depending on the conversion intensity.

Furthermore, according to the present embodiment, when the original image is synthesized on the first painting image in a transmissive manner, the transmittances (first transmittance and second transmittance) have preset values previously determined based on the rule of thumb. However, the degree of local changes between the original image and the first painting image is checked and the transmittances for the transmissive synthesis may be determined based on the checked degree of local changes. In this case, the transmittances for the portion of a higher degree of changes may be set relatively lower than the transmittances for the portion of a lower degree of changes.

Additionally, if the transmittances are determined based on the degree of changes, the transmittances may be calculated using a predetermined function having, for example, the degree of changes and an adjustment value previously determined for each painting style, as parameters. The degree of local changes may be determined based on one or more feature amounts, for example, representative colors for respective blocks into which each of the original image and the first painting image is divided, the rate of each of the representative colors, and the density, within each block, of a contour line extracted from the block by contour extraction.

Moreover, when the original image is on the first painting image in a transmissive manner, the transmittances (first transmittance and second transmittance) may be determined based on the features of the original image. That is, if the original image is complex (the original image shows various things), a snapshot-to-painting conversion is likely to make the face look unnatural. In contrast, if the original image is simple (the background is solid in color), a snapshot-to-painting conversion is unlikely to make the face look unnatural. Thus, a transmittance table 100 may be prepared which shows transmittances in association with the degrees of complexity of the original image so that a relatively lower transmittance can be set for a more complex image, whereas a relatively higher transmittance can be set for a more simple image.

Furthermore, the present embodiment describes the case where when the original image and the first painting image are synthesized, the transmittance for the original image is determined depending on the painting style. However, according to the present invention, the original image (photographic image) may be synthesized on the first painting image at a predetermined transmittance. Thus, when the original image and the first painting image are synthesized, the transmittance for the first painting image may be determined depending on the painting style. In this case, for example, the transmittances for the oil painting style and the water color painting style in the transmittance table 100 may be such that a relatively higher transmittance is set for the oil painting style, whereas a relatively lower transmittance is set for the water color painting, in contrast to the present embodiment.

Additionally, the present embodiment describes the configuration with the snapshot-to-painting converter 16 that carries out a snapshot-to-painting conversion process of converting the original image data into the first painting image data. However, of course, when the present invention is implemented, a configuration may be adopted in which the controller 12 carries out a snapshot-to-painting conversion process instead of the snapshot-to-painting converter 16.

in addition, the present, embodiment mainly describes the case where photographic image data is converted into a painting image. However, the present invention is applicable to a case where the photographic image is converted into an image with any artificial feature other than the painting style.

Furthermore, the present embodiment describes the case where the present invention is applied to the server 11 that implements the image service site 10. However, the present invention is applicable to any apparatus having an image processing function to enable the original image to be converted into various images with predetermined artificial features including painting images. Examples of such an apparatus include a digital camera, a digital photo frame mainly intended to display images ken with a digital camera for private use, and a general-purpose personal computer.

Several embodiments of the present, invention and modifications thereof have been described. The embodiments and modifications may be varied where appropriate as long as the operation and effects of the present invention can be achieved. The varied embodiments are also included in the scope of the invention set forth in the claims and inventions equivalent to this invention.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means is installed.

What is claimed is:

1. An image processing apparatus comprising:
a memory configured to store a photographic image; and
a computer configured to convert the photographic image stored in the memory into a first image with artificial features,
wherein the first image with the artificial features is a painting image with one of various selectable styles of painting, and
wherein the computer is further configured to:
select a painting style from the various styles of painting;
detect a predetermined area from the photographic image stored in the memory;
determine a transmittance at which an image of the predetermined area of the photographic image is to be synthesized on the first image in a transmissive manner in accordance with the selected painting style; and synthesize the image of the predetermined area on the first image in the transmissive manner at the determined transmittance to generate a second image with realism by adding an element of the original photographic image in a predetermined region of the first image.

2. The image processing apparatus according to claim 1, wherein the predetermined area is an area corresponding to a person's face.

3. The image processing apparatus according to claim 2, wherein the computer is configured to synthesize the photographic image on the first image under a condition that the predetermined area corresponds to the detected person's face.

4. The image processing apparatus according to claim 1, wherein the various styles of painting includes at least an oil painting style and a water color painting style, and
wherein the transmittance is set such that a transmittance in the case of the oil painting style is lower than a transmittance in the case of the water color painting style.

5. The image processing apparatus according to claim 2, wherein with respect to each of the various styles of painting, a first transmittance of an entire area and a background area and a second transmittance of an area corresponding to the person's face are set such that the second transmittance is relatively lower than the first transmittance.

6. An image processing method comprising:
storing a photographic image in a memory;
detecting a predetermined area from the photographic image stored in the memory;
selecting a painting style from various selectable styles of painting with various styles of artificial features;
converting the photographic image stored in the memory into a first image with the selected style of painting;
determining a transmittance at which an image of the predetermined area of the photographic image is to be synthesized on the first image in a transmissive manner in accordance with the selected style of painting; and
synthesizing the detected image of the predetermined area of the photographic image on the first image in the transmissive manner at the determined transmittance to generate a second image with realism by adding an element of the original photographic image in a predetermined region of the first image.

7. The image processing method according to claim 6, wherein the predetermined area is an area corresponding to a person's face.

8. The image processing method according to claim 7, wherein the photographic image is synthesized on the first image under a condition that the predetermined area corresponds to the detected person's face.

9. The image processing method according to claim 6, wherein the various styles of painting includes at least an oil painting style and a water color painting style, and
wherein the transmittance is set such that a transmittance in the case of the oil painting style is lower than a transmittance in the case of the water color painting style.

10. The image processing method according to claim 7, wherein with respect to each of the various styles of painting, a first transmittance of an entire area and a background area and a second transmittance of an area corresponding to the person's face are set such that the second transmittance is relatively lower than the first transmittance.

11. A non-transitory computer readable storage medium having stored thereon a computer program which is executable by a computer that includes a memory for storing a photographic image, the program causing the computer to perform functions comprising:
detecting a predetermined area from the photographic image stored in the memory;
selecting a painting style from various selectable styles of painting with various styles of artificial features;
converting the photographic image stored in the memory into a first image with the selected style of painting;
determining a transmittance at which an image of the predetermined area of the photographic image is to be synthesized on the first image in a transmissive manner in accordance with the selected style of painting; and
synthesizing the detected image of the predetermined area of the photographic image on the first image in the transmissive manner at the determined transmittance to generate a second image with realism by adding an element of the original photographic image in a predetermined region of the first image.

* * * * *